United States Patent
Herbeth et al.

(10) Patent No.: US 8,652,004 B2
(45) Date of Patent: Feb. 18, 2014

(54) METHOD FOR OPERATING A VEHICLE DRIVE TRAIN HAVING A DRIVING MACHINE AND HAVING A TRANSMISSION APPARATUS HAVING A PLURALITY OF SHIFT ELEMENTS

(75) Inventors: Valentine Herbeth, Friedrichshafen (DE); Jorg Arnold, Immenstaad (DE); Georg Mihatsch, Lindau (DE); Thilo Schmidt, Meckenbeuren (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 42 days.

(21) Appl. No.: 13/521,751

(22) PCT Filed: Dec. 21, 2010

(86) PCT No.: PCT/EP2010/070386
§ 371 (c)(1),
(2), (4) Date: Jul. 12, 2012

(87) PCT Pub. No.: WO2011/085926
PCT Pub. Date: Jul. 21, 2011

(65) Prior Publication Data
US 2013/0035205 A1    Feb. 7, 2013

(30) Foreign Application Priority Data
Jan. 13, 2010   (DE) .......................... 10 2010 000 857

(51) Int. Cl.
*B60W 10/00* (2006.01)
*F16H 31/00* (2006.01)

(52) U.S. Cl.
USPC ............... 477/79; 477/80; 475/116; 475/118; 475/121

(58) Field of Classification Search
USPC .......................... 477/79, 80, 70; 475/116–127
See application file for complete search history.

(56) References Cited

U.S. PATENT DOCUMENTS

| | | | |
|---|---|---|---|
| 5,417,627 A | 5/1995 | Iizuka | |
| 5,997,435 A | 12/1999 | Back | |
| 6,962,549 B2 | 11/2005 | Dreibholz et al. | |
| 7,951,043 B2 | 5/2011 | Reisch et al. | |
| 8,113,983 B2 | 2/2012 | Gumpoltsberger | |

(Continued)

FOREIGN PATENT DOCUMENTS

| | | |
|---|---|---|
| DE | 39 37 302 A1 | 5/1991 |
| DE | 43 02 247 A1 | 7/1993 |
| DE | 197 17 042 A1 | 10/1998 |
| DE | 102 44 023 A1 | 4/2004 |
| DE | 10 2005 013 137 A1 | 9/2006 |
| DE | 10 2007 011 507 A1 | 9/2008 |

(Continued)

*Primary Examiner* — Tisha Lewis
(74) *Attorney, Agent, or Firm* — Davis & Bujold, PLLC; Michael J. Bujold

(57) ABSTRACT

A method of operating a vehicle drive train having a drive machine, a transmission apparatus having a plurality of shift elements and an output drive. The plurality of shift elements are engaged or disengaged in a power flow for achieving different transmission ratios within the transmission apparatus. The output drive is coupled to a transmission output shaft and the drive machine is coupled to a transmission input shaft of the transmission apparatus. Upon a request to interrupt power flow within the transmission apparatus, between the transmission input shaft and the transmission output shaft, a maximum number of shift elements are transferred to and/or held in an engaged operating state, and the remaining portion of the shift elements are transferred to and/or held in a disengaged operating state with the transmission output shaft being rotatable.

12 Claims, 3 Drawing Sheets

(56) References Cited

U.S. PATENT DOCUMENTS

| | | |
|---|---|---|
| 8,187,151 B2 | 5/2012 | Gloge |
| 8,210,981 B2 * | 7/2012 | Bauknecht et al. ........... 475/275 |
| 8,398,522 B2 * | 3/2013 | Bauknecht et al. ........... 475/275 |
| 2007/0004555 A1 | 1/2007 | Berger |
| 2007/0011507 A1 | 1/2007 | Rothman et al. |
| 2009/0250310 A1 * | 10/2009 | Popp et al. ................ 192/85 R |
| 2011/0009229 A1 | 1/2011 | Bauknecht et al. |
| 2012/0135838 A1 | 5/2012 | Cuppers et al. |

FOREIGN PATENT DOCUMENTS

| | | |
|---|---|---|
| DE | 10 2007 022 776 A1 | 12/2008 |
| DE | 10 2008 000 429 A1 | 9/2009 |
| DE | 10 2008 040 665 A1 | 6/2010 |
| DE | 10 2009 028 305 A1 | 2/2011 |
| EP | 0 992 706 A2 | 4/2000 |
| GB | 2 335 010 A | 9/1999 |
| WO | 2011/015466 A1 | 2/2011 |

\* cited by examiner

|   | A | B | C | D | E | F |
|---|---|---|---|---|---|---|
| "1" | X |   |   | X |   | X |
| "2" | X |   | X |   |   | X |
| "3" | X | X |   |   |   | X |
| "4" | X |   |   |   | X | X |
| "5" | X | X |   |   | X |   |
| "6" | X |   | X |   | X |   |
| "7" | X |   |   | X | X |   |
| "8" |   |   | X | X | X |   |
| S | X | X | X | X |   |   |

# METHOD FOR OPERATING A VEHICLE DRIVE TRAIN HAVING A DRIVING MACHINE AND HAVING A TRANSMISSION APPARATUS HAVING A PLURALITY OF SHIFT ELEMENTS

This application is a National Stage completion of PCT/EP2010/070386 filed Dec. 21, 2010, which claims priority from German patent application serial no. 10 2010 000 857.5 filed Jan. 13, 2010.

FIELD OF THE INVENTION

The invention relates to a method for operating a vehicle drive train having a drive machine and having a transmission apparatus comprising a plurality of shift elements.

BACKGROUND OF THE INVENTION

Vehicle drive trains known in practice typically comprise drive machines implemented as internal combustion engines, which in each case can be brought into operative connection with an output drive; where the drive machines each have a transmission apparatus having a plurality of shift elements that can be engaged or disengaged for implementing different transmission ratios in a power flow. The output drive is coupled to a transmission output shaft and the drive machine is coupled to a transmission input shaft of the transmission apparatus.

During progressions of operating states, during which an output speed is greater than zero and a driver of the vehicle removes his foot from the gas and the vehicle coasts, in conventional operating mode of the vehicle drive train, the vehicle brakes itself due to engine braking by the drive machine that is running connected.

Drivers who drive in a fuel-saving manner often find this braking undesirable. For this reason, a vehicle, in the presence of various operating state parameters, during a previously described operating state progression, transfers into a so-called sailing mode during which the drive machine is decoupled from the output drive, for example in the region of the transmission apparatus by interrupting the power flow between the transmission input shaft and the transmission output shaft, and switched off. Then, the vehicle continues rolling without burning fuel and without hindrance from a braking moment from the drive machine, whereby vehicle fuel consumption is reduced.

However, a problem here is that with the presence of a request for coupling to, or for producing the power flow in the transmission apparatus between the transmission input shaft and the transmission output shaft, an undesirably long period of time is necessary before the power flow is produced again the region of the transmission apparatus.

SUMMARY OF THE INVENTION

Therefore, the problem addressed by the present invention is to provide a method for operating a vehicle drive train by means of which vehicle fuel consumption can be reduced, and with which a power flow can be produced in the region of a transmission apparatus within shorter operating times.

With the method according to the invention for operating a vehicle drive train having a drive machine, having a transmission apparatus with a plurality of shift elements, which are engaged or disengaged in a power flow for representing different transmission ratios, and having an output drive, wherein the output drive is coupled to a transmission output shaft and the drive machine is coupled to a transmission input shaft of the transmission apparatus, in the presence of a request to interrupt the power flow in the transmission apparatus between the transmission input shaft and the transmission output shaft, a maximum number of shift elements are transferred into and/or held in an engaged operating state, and the other portion of the shift elements are transferred into and/or held in a disengaged operating state, wherein the transmission output shaft is rotatable.

The procedure is based on the realization that in principle, engaged shift elements can be transferred into a disengaged operating state within a shorter operating time than disengaged shift elements being transferred into an engaged operating state. By transferring and/or holding a maximum number of a shift elements in an engaged operating state, and transferring into and/or holding the remaining portion of the shift elements in a disengaged operating state when there is a request for interrupting the power flow in the transmission apparatus between the transmission input shaft and the transmission output shaft, with a subsequent request for producing the power flow, the power flow can be produced in the region of the transmission apparatus within shorter operating times because for producing the power flow, it is preferred to disengage the shift elements rather than to engage them.

According to the invention, with a request to interrupt the power flow between the transmission input shaft and the transmission output shaft in an operating state of the transmission apparatus, in which a form-locking shift element in the transmission apparatus is disengaged, the form-locking shift element is engaged, when a differential speed in the region of the form-locking shift element is guided into a differential speed range, within which the form-locking shift element can be engaged, by engaging the sift elements after neutralizing the power flow. Thus, the vehicle drive train is already prepared during the interruption of the power flow for the later production of power flow in the region of the transmission apparatus in that to form-locking shift element to be transferred into an engaged operating sate for producing the power flow is, with the power flow interrupted, initially synchronized by a defined actuation of the shift elements, and is engaged in an at least nearly synchronous operating state.

Furthermore, fuel consumption of a vehicle drive train operated according to the invention, or fuel consumption of the drive machine, can be reduced in a simple manner in that the drive machine, preferably implemented as an internal combustion engine, is decoupled from the output drive and can be operated without burning fuel similarly to a sailing mode, known from the prior art.

In an advantageous variant of the method according to the invention, at a transmission input shaft speed that is greater than zero, and with a request for interrupting the power flow between the transmission input shaft and the transmission output shaft, the shift elements are transferred into and/or are held in the engaged or disengaged operating state.

With the power flow interrupted between the transmission input shaft and the transmission output shaft, if the transmission input shaft is held at least nearly without rotation by the engaged shift elements, then with interrupted power flow, the transmission apparatus is transferred into and held in a defined operating state in a simple manner, starting from which the power flow can be produced in the region of the transmission input shaft in a simple manner.

With nearly zero drive machine torque present at a transmission input shaft, if the transmission input shaft is held rotationally fixed by the shift elements, then stalling of the drive machine, implemented as an internal combustion engine, is avoided in a simple manner.

With a request for producing the power flow between the transmission input shaft and the transmission output shaft subsequent to the request for interrupting the power flow between the transmission input shaft and the transmission output shaft, when the speed of the transmission input shaft is adapted at least nearly to the speed of the transmission output shaft by actuating the shift elements to be transferred into an engaged operating state for representing the transmission ratio to be engaged in the transmission apparatus, then the vehicle drive train at this point in time at which the power flow is produced, is currently in a synchronous operating state without further measures, within shorter operating times.

In a further advantageous variant of the method according to the invention, if subsequent to a request for interrupting the power flow between the transmission input shaft and the transmission output shaft, there is a request for producing the power flow between the transmission input shaft and the transmission output shaft in an operating state of the transmission apparatus in which a form-locking shift element in the transmission apparatus is disengaged, which with the presence a request for producing the power flow is to be engaged, a differential speed in the region of the form-locking shift element is guided into a differential speed range, in which the form-locking shift element can be engaged, by setting the speed of the transmission input shaft on the side of the drive machine. Here, with low control and regulating expenditure, it is guaranteed that a form-locking shift element to be engaged for producing the power flow can be transferred within a predefined shift time into an engaged operating state, and the power flow can be made available in shorter operating times.

If the drive machine is switched off, with interrupted power flow in the transmission apparatus, reaction moments in the region of the output drive, resulting from the switching off procedure are avoided, which under circumstances would degrade driving comfort.

For representing a defined operating state with interrupted power flow in the region of the transmission apparatus and with the drive machine switched off, the transmission input shaft can be held rotationally fixed by actuation of the shift elements.

In a further advantageous variant of the method according to the invention, if subsequent to a request for interrupting the power flow between the transmission input shaft and the transmission output shaft, there is a request for producing the power flow between the transmission input shaft and the transmission output shaft, the drive machine is engaged before the production of power flow in the region of the transmission apparatus. With this, the drive machine is advantageously available for synchronizing the speed of the transmission input shaft and the speed of the transmission output shaft in order to be able to produce the power flow in the region of the transmission apparatus with the least possible loading in the region of the shift elements to be actuated.

If the drive machine is switched on after producing the power flow in the region of the transmission apparatus, the fuel savings is greater than with the latter procedure.

Further advantages and advantageous variants of the method according to the invention arise from the example embodiments described in the following based in principle on the drawings, where for the sake of clarity, in the description of the different example embodiments, components that are the designed the same way or are functionally equivalent are provided with the same reference numbers.

Features specified in the following example embodiments of the subject matter according to the invention are suitable, alone or in any arbitrary combination, to further develop the subject matter according to the invention. The respective combinations of features do not represent limitations with respect to the further development of the subject matter according to the invention, but rather merely comprise examples.

DETAILED DESCRIPTION OF THE PREFERRED EMBODIMENTS

Figure 1:
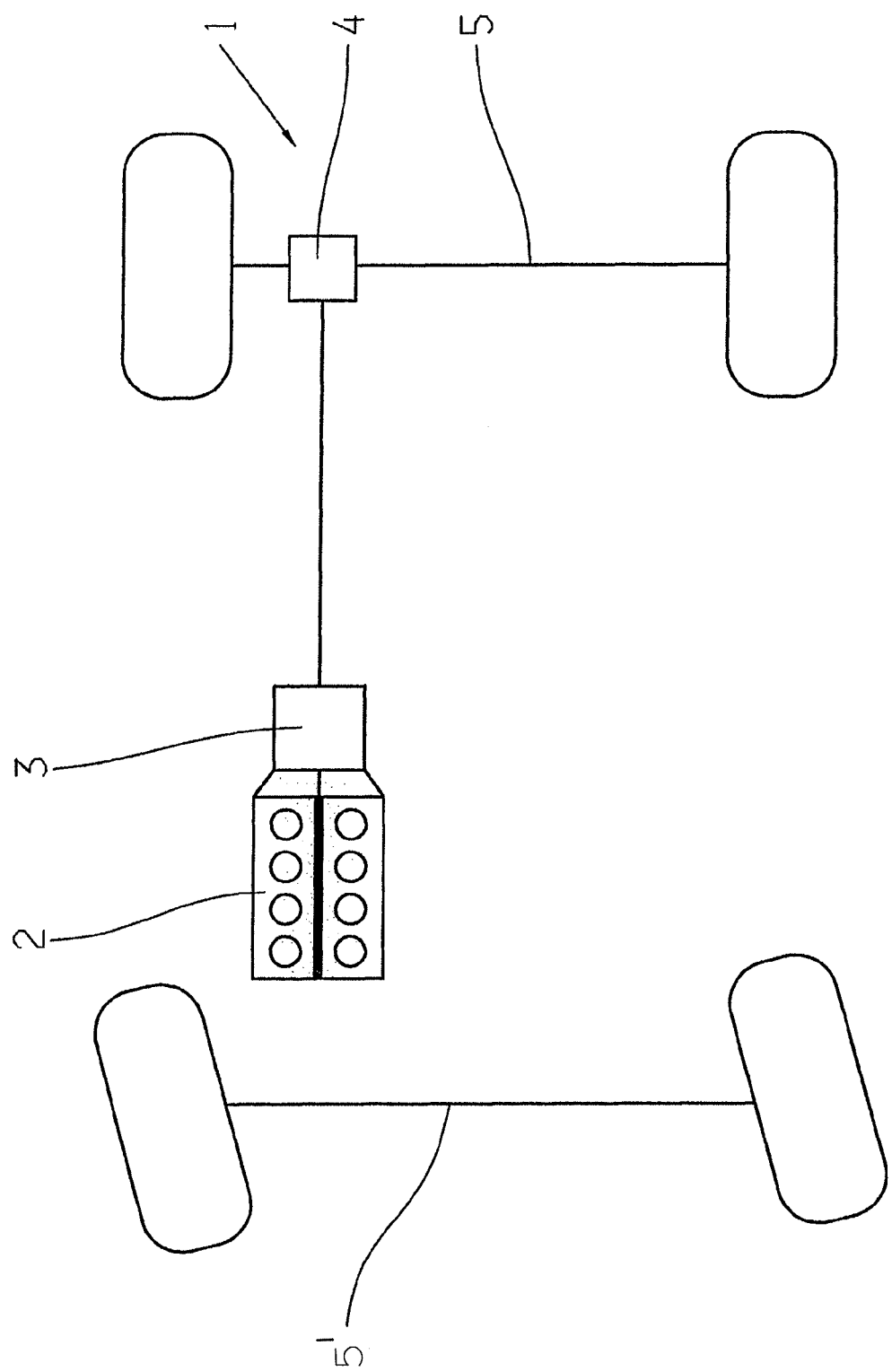
FIG. 1 a highly schematic representation of a vehicle drive train.

FIG. 1 shows a vehicle drive train 1 having a drive machine 2 constructed here as an internal combustion engine, having a transmission apparatus 3, by means of which different transmission ratios for forward and reverse travel can be represented, having a differential transmission unit 4 and having two vehicle axles 5, 5', wherein the vehicle axle 5 is the rear vehicle axle and the vehicle axle 5' is the front vehicle axle.

Figures 2, 3:
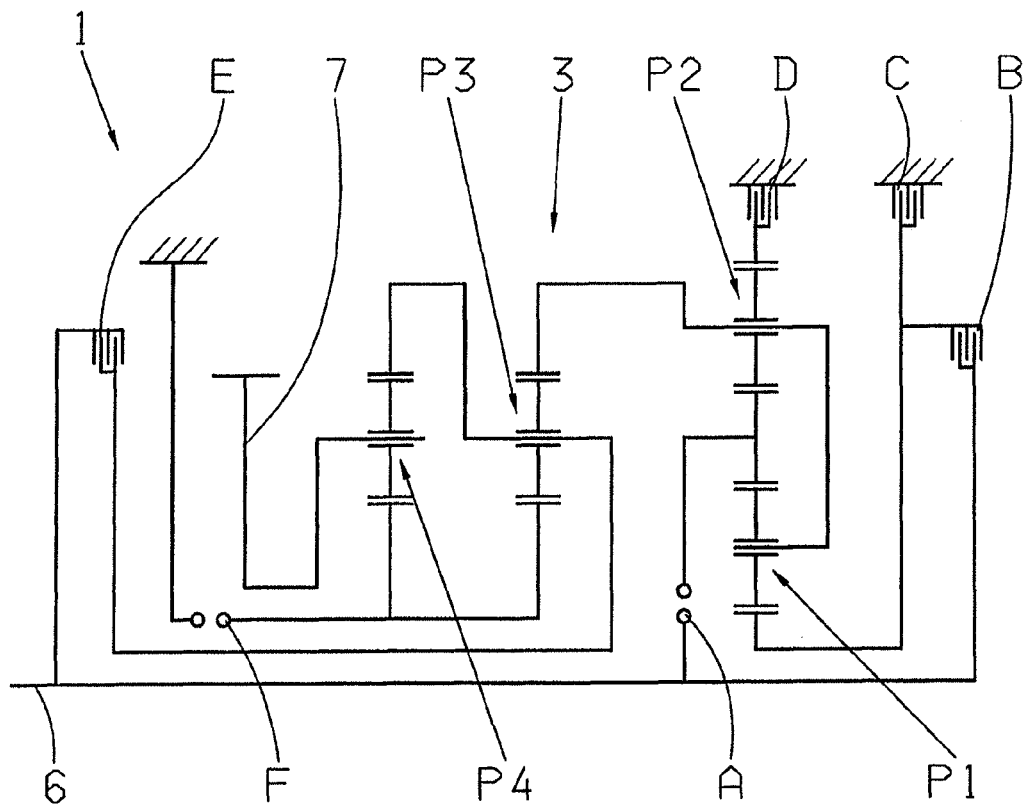
FIG. 2 a gear set of a first embodiment of a transmission apparatus of the vehicle drive train according to FIG. 1.
FIG. 3 a shift pattern of the transmission apparatus according to FIG. 2.

A gear pattern of a first embodiment of the transmission apparatus 3, or a multi-stage transmission, is shown in FIG. 2, which is known in principle from the document DE 10 2008 000 429 A1. The transmission apparatus 3 comprises a transmission input shaft 6 and a transmission output shaft 7, which is connected to the differential transmission input 4 in a state assembled in a vehicle, while the transmission input shaft 6 is operatively connected to the drive machine 2.

Furthermore, the transmission apparatus 3 comprises four planetary gear sets P1 to P4, wherein the first and the second planetary gear set P1, P2 are preferably designed as minus planetary gear sets, forming a shiftable input side gear set, while the third and the fourth planetary gear sets P3, P4 represent the main gear set. In addition, the transmission apparatus 3 comprises six shift elements A to F, where the shift elements C, D and F are implemented as brakes, and the shift elements A, B and E are implemented as clutches.

With the shift elements A to F, selective shifting of at least eight forwards gears "1" to "8" and one reverse gear "R" can be implemented, wherein for implementing a transmission ratio in the transmission apparatus 3, or for producing a power flow in the transmission apparatus 3 between the transmission input shaft 6 and the transmission output shaft 7, in each case, three shift elements are to be simultaneously guided into, or held in, an engaged operating state.

The shift elements A and F are designed here as form-locking shift elements in order to reduce drag torques, caused by disengaged frictionally engaging shift elements, in the operation of the transmission apparatus 3, compared to transmission apparatuses that are designed having only frictionally engaging shift elements. Because form-locking shift elements in general can only be transferred from a disengaged operating state into an engaged operating state within a very narrow differential speed range around the synchronization speed, the synchronizing of a form-locking shift element to be shifted is supported, or fully implemented, without additional constructive designs by appropriately actuating the frictionally engaging shift elements or via engagement of the engine.

If the eighth transmission ratio "8" for forward travel is engaged in the transmission apparatus 3, the shift elements C, D and E are held in the engaged state. With a request for a transmission ratio in a sailing mode of the vehicle drive train 1, there is simultaneously also a request for an interruption of the power flow in the region of the transmission apparatus 3 between the transmission input shaft 6 and the transmission output shaft 7. Additionally, the drive machine 2 is also to be switched off for representing the sailing mode.

In the process, the frictionally engaging shift element E is initially disengaged and the drive machine 2 is subsequently switched off. Actuation pressure of the shift element B is increased in a ramp-like manner until a differential speed in the region of the form-locking shift element A, presently as before in the disengaged state, is guided within a speed range within which the form-locking shift element A is at least nearly in a synchronous operating state, in which the form-locking shift element A can be transferred into an engaged state in a simple manner.

Because the drive machine 2 is switched off, it does not provide the drive torque necessary for the oil supply of the shift elements as a primary oil supply, which comprises a transmission oil pump operatively connected to the transmission input shaft 6. For this reason, the transmission apparatus 3 comprises a secondary oil supply, not represented in more detail. This can be designed such that, with the drive machine 2 switched off, the hydraulic supply is provided by means of an electrically driven pump for example.

Along with the form-locking shift element A, the shift elements C and D are also held in an engaged operating state, whereby the shift elements A, B, C and D are in the engaged operating state in sailing mode S of the vehicle drive train 1, or the transmission apparatus 3. The power flow is interrupted between the transmission input shaft 6 and the transmission output shaft 7, and the transmission output shaft 7 can rotate freely, while the transmission input shaft 6 is held rotationally fixed by the engaged shift elements A to D.

If following a request for interrupting the power flow in the region of the transmission apparatus 3, there is a request for producing the power flow between the transmission input shaft 6 and the transmission output shaft 7, initially the present operating state of the vehicle drive train 1, or a speed of the output drive of the vehicle drive train 1, is determined. If, based on the present determined operating state of the vehicle drive train 1, starting with the sailing mode S, the seventh transmission ratio step "7" is to be engaged in the transmission apparatus 3, the shift elements B and C are transferred into their disengaged operating state while the shift element E is engaged.

If, based on the present operating state of the vehicle drive train 1 in the transmission apparatus 3, the sixth transmission ratio step "6" is to be engaged in the transmission apparatus, the shift elements B and D are disengaged, whereas the shift element E is engaged. If the fifth transmission ratio step "5" is to be engaged, the shift elements C and D are to be disengaged, whereas the shift element E is to be engaged.

Because a gear set group comprising the planetary gear sets P1 and P2 is blocked during the sailing mode S, the production of the power flow can be realized very quickly by an entry in the higher gear steps with simultaneous interruption of the sailing mode.

The speed of the transmission input shaft 6 is to be increased to a speed level equivalent to the speed level of the transmission output shaft 7 either by means of engaging the frictionally engaging shift element E, or the engaged drive machine 2, depending on the application case.

With the transition into the sailing mode S, initially the power flow is basically interrupted by disengaging one or more of the shift elements A to F, and subsequently the drive machine 2 is switched off. After switching off the drive machine 2, the planetary gear sets P1 and P2 are blocked by engaging and/or holding the shift elements A to D in the engaged operating state, wherein during this procedure the transmission elements of the transmission apparatus 3 coupled to the transmission input shaft 6, or the speed thereof, are drawn down to zero.

With a transfer into sailing mode S, starting from the eighth transmission step "8", the form-locking shift element shift element A is only engaged when the differential speed in the area of the form-locking shift element A approaches the value of zero. The gear set group of the transmission apparatus 3 comprising the planetary gear sets P1 and P2 remains blocked during the entire time of sailing mode S.

With exiting from sailing mode S, the power flow is produced in the transmission apparatus 3 in that the shift elements to be engaged for representing the requested transmission ratio in the transmission apparatus 3 are engaged, or are held in an engaged operating state, and subsequently a shift element of the gear that is to be selected or the target gear, that is still disengaged, is engaged, or synchronized. In general, this procedure allows the power flow to be produced in the region of the transmission apparatus 3 as quickly as possible with minimal volume required at the oil pump.

Based on the present operating state of the vehicle drive train 1, starting with sailing mode S in the transmission apparatus 3, if the first transmission ratio step "1", the second transmission ratio step "2", the third transmission ratio step "3" or the fourth transmission ratio step "4" are to be engaged, in each case, the further form-locking shift element F and two further shift elements A and D, A and C, A and B, or A and E are to be transferred into an engaged operating state.

Because the form-locking shift element A is already in the engaged operating state thereof during transition into the sailing mode S, the respective shift elements B and C, B and D, C and D or B to D, are to be disengaged, whereas one of the frictionally engaging shift elements D, C or B is to be held in the engaged operating state, or the frictionally engaging shift element E is to be transferred into the engaged operating state thereof. The form-locking shift element F is then engaged in the power flow, wherein synchronization of the form-locking shift element F is synchronized during the engine run-up of the drive machine 2, or after completing the engine run-up via a defined engine engagement in the region of the drive machine 2, and is subsequently engaged.

Figures 4, 5:
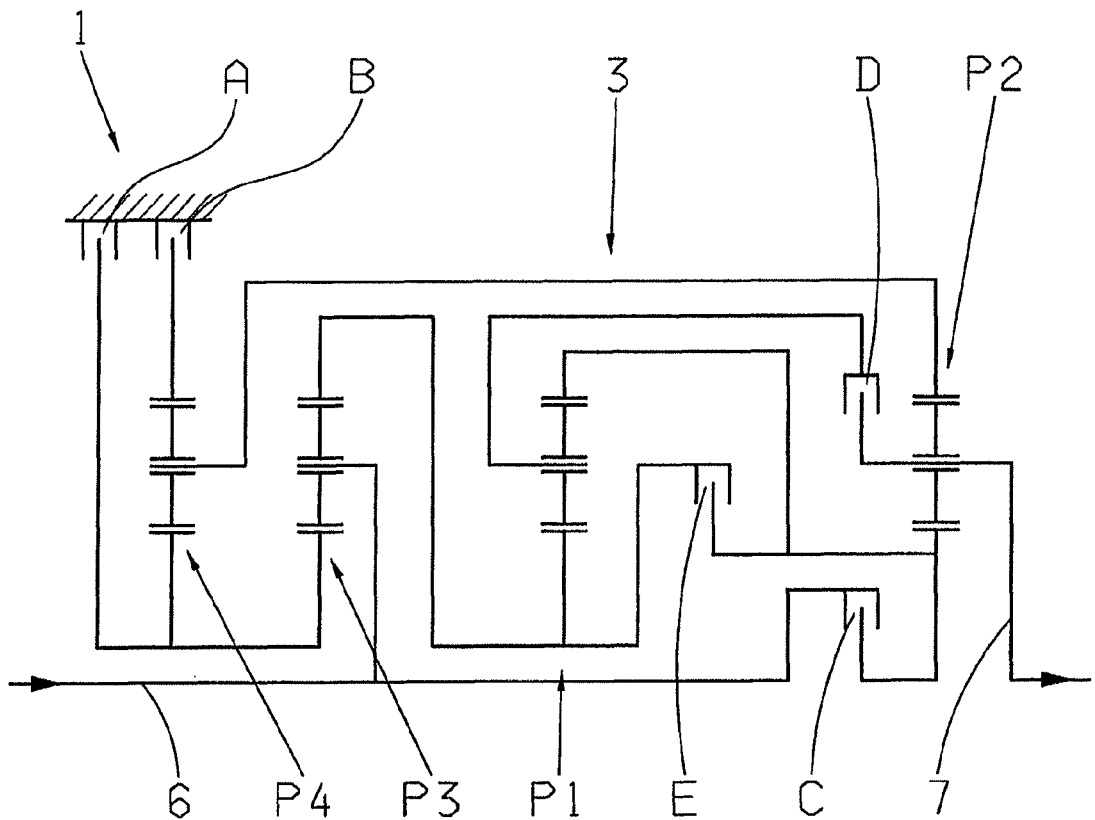
FIG. 4 a gear set of a second embodiment of a transmission apparatus of the vehicle drive train according to FIG. 1.
FIG. 5 a shift pattern of the transmission apparatus according to FIG. 4.

FIG. 4 shows a gear pattern of a second embodiment of the transmission apparatus 3, which is designed having five frictionally engaging shift elements A to E and four planetary gear sets P1 to P4. According to the shifting pattern shown in FIG. 5, at least eight transmission ratios "1" to "8" for forwards travel and one reverse gear can be represented via the transmission apparatus 3 according to FIG. 4, wherein for this purpose, in each case, three of the shift elements A to E are to be held in the engaged operating state, while the remaining shift elements are disengaged.

For representing the sailing mode S, the shift elements A, C and E are to be held in the engaged operating state, whereas the shift elements B and D are disengaged. In a simple manner, this attains that a maximum number of the shift elements A to E are engaged during sailing mode, the transmission output shaft 7 rotates freely, and simultaneously the transmission input shaft 6 is held rotationally fixed.

For leaving sailing mode S, in each case the transmission ratio that is suitable for the determined present operating state of the vehicle drive train 1 is to be engaged in the transmission apparatus 3, for which purpose, the corresponding shift elements are to be guided into and/or to be held in, an engaged operating state, whereas the further shift elements are to be disengaged and/or to be held in the disengaged state.

REFERENCE CHARACTERS 1 vehicle drive train
2 drive machine
3 transmission apparatus
4 differential transmission unit
5, 5' vehicle axles
6 transmission input shaft
7 transmission output shaft
"1" to "8" transmission ratio for forward travel
A to F shift elements
P1 to P4 planetary gear set
S sailing mode

The invention claimed is:

1. A method for operating a vehicle drive train (1) comprising:
a drive machine (2);
a transmission apparatus (3) comprising a plurality of shift elements (A to F) which are either engaged or disengaged in a power flow for implementing different transmission ratios ("1" to "8") within the transmission apparatus (3); and
an output drive,
the output drive being coupled to a transmission output shaft (7) of the transmission apparatus (3) and the drive machine (2) being coupled to a transmission input shaft (6) of the transmission apparatus (3),
upon a request to interrupt the power flow in the transmission apparatus (3), between the transmission input shaft (6) and the transmission output shaft (7), maintaining and transferring into an engaged operating state a maximum number of shift elements (A to F) while maintaining and transferring into a disengaged operating state a remaining portion of the shift elements (A to F) with the transmission output shaft (7) being rotatable;
upon issuing a request for interrupting the power flow, between the transmission input shaft (6) and the transmission output shaft (7) in an operating state of the transmission apparatus (3), disengaging a form-locking shift element (A) in the transmission apparatus (3),
subsequently engaging the form-locking shift element (A) when a differential speed, in a region of the form locking shift element (A), is within a differential speed range in which the form locking shift element (A) can be engaged by engaging one of the plurality of the shift elements (B to E) after neutralizing the power flow.

2. The method according to claim 1, further comprising the step of initiating the method while the speed of the transmission output shaft (7) is greater than zero.

3. The method according to claim 1, further comprising the step of maintaining the transmission input shaft (6), with interrupted the power flow between the transmission input shaft (6) and the transmission output shaft (7), at least nearly rotationally fixed by the one of the engaged shift element (A to D; A, D, E).

4. The method according to claim 3, further comprising the step of maintaining the transmission input shaft (6) rotationally fixed by the plurality of shift elements (A to D; A, D, E) with a torque of the drive machine (2) present at the transmission input shaft (6) being at least nearly zero.

5. The method according to claim 1, further comprising the step of, after a request for interrupting the power flow between the transmission input shaft (6) and the transmission output shaft (7), with a request for producing the power flow between the transmission input shaft (6) and the transmission output shaft (7), the shift elements (A to F) to be engaged in the transmission apparatus for representing the transmission ratio ("1" to "7") to be engaged depending on the operating state, at least one of maintaining and transferring into the engaged operating state, whereas the further shift elements (A to F) are at least one of transferred into and held in the disengaged operating state.

6. The method according to claim 1, further comprising the step of, after the request for interrupting the power flow between the transmission input shaft (6) and the transmission output shaft (7), with a request for producing the power flow between the transmission input shaft (6) and the transmission output shaft (7), adjusting the speed of the transmission input shaft (6) to at least nearly the speed of the transmission output shaft (7) by actuating the shift elements (A to F) to be guided into the engaged operating state for representing the transmission ratio ("1" to "7") to be engaged in the transmission apparatus (3).

7. The method according to claim 1, further comprising the step of, after the request for interrupting the power flow between the transmission input shaft (6) and the transmission output shaft (7), with a request for producing the power flow between the transmission input shaft (6) and the transmission output shaft (7), in an operating state of the transmission apparatus in which another form-locking shift element (F) is disengaged in the transmission apparatus, which with a request for producing the power flow is to be engaged, guiding a differential speed in the region of the form-locking shift element (F) into a differential speed range, within which the form-locking shift element (F) is engagable, by setting the speed of the transmission input shaft (6) by the drive machine.

8. The method according to claim 1, further comprising the step of upon interruption of the power flow in the transmission apparatus (3), switching off the drive machine (2).

9. The method according to claim 8, further comprising the step of with the drive machine (2) switched off, maintaining the transmission input shaft (6) rotationally fixed by actuating the shift elements (A to D; A, C, E).

10. The method according to claim 1, further comprising the step of, after the request to interrupt the power flow between the transmission input shaft (6) and the transmission output shaft (7) and the subsequent request to produce power flow between the transmission input shaft (6) and the transmission output shaft (7), engaging the drive machine (2) before producing the power flow in the region of the transmission apparatus (3).

11. The method according to claim 1, further comprising the step of, after the request for interrupting the power flow between the transmission input shaft (6) and the transmission output shaft (7) and the subsequent request for producing the power flow between the transmission input shaft (6) and the transmission output shaft (7), engaging the drive machine (2) after producing the power flow in the region of the transmission apparatus (3).

12. A method of operating a vehicle drive train comprising:
a drive machine,
a transmission comprising a plurality of shift elements which are selectively engagable in a power flow for implementing a plurality of different transmission ratios, and an output drive, the output drive being coupled to an output shaft of the transmission and the drive machine being coupled to an input shaft of the transmission, the method comprising the steps of:

operating the transmission in a state in which a maximum number of the shift elements are engaged and a remainder of the shift elements are disengaged, with at least one of the remainder of the shift elements being a form-locking shift element, and the output shaft of the transmission being rotatable;

requesting an interruption of the power flow in the transmission apparatus between the transmission input shaft and the transmission output shaft;

neutralizing the power flow in the transmission and adjusting a differential rotational speed of the form-locking shift element to be within a differential speed range by controlling engagement and disengagement of the plurality of the shift elements; and engaging the form-locking shift element when the differential rotational speed of the form-locking shift element is within the differential speed range.

\* \* \* \* \*